United States Patent [19]

Okamura et al.

[11] Patent Number: 4,457,474
[45] Date of Patent: Jul. 3, 1984

[54] MAGNETIC TAPE CARTRIDGE

[75] Inventors: Masatoshi Okamura; Haruo Shiba, both of Tokyo, Japan

[73] Assignee: TDK Electronics Co., Ltd., Tokyo, Japan

[21] Appl. No.: 382,764

[22] Filed: May 27, 1982

[30] Foreign Application Priority Data

Jun. 18, 1981 [JP] Japan .................. 56-88740[U]

[51] Int. Cl.³ .................. G03B 1/05; G11B 15/32
[52] U.S. Cl. .................. 242/199; 206/387
[58] Field of Search .......... 242/71.8, 74, 197–200; 116/DIG. 41; 40/330; 206/387; 360/132

[56] References Cited

U.S. PATENT DOCUMENTS

| | | | |
|---|---|---|---|
| 2,026,032 | 12/1935 | Gottlieb | 242/118.3 |
| 3,592,407 | 7/1971 | Hagmann et al. | 242/118.3 |
| 3,622,102 | 11/1971 | Fox | 242/199 |
| 3,675,871 | 7/1972 | Heyden | 242/118.3 |
| 3,905,561 | 9/1975 | Kelch et al. | 242/71.8 |
| 3,987,975 | 10/1976 | Jackson | 242/71.8 |

FOREIGN PATENT DOCUMENTS 13674 of 1904 United Kingdom ............ 242/71.8

Primary Examiner—Leonard D. Christian
Attorney, Agent, or Firm—Oblon, Fisher, Spivak, McClelland & Maier

[57] ABSTRACT

A combination of feeding and take-up reels in a magnetic tape cartridge comprises a feeding reel constructed with an upper flange, a lower flange, a reel drum for connecting said upper and lower flanges, and a center boss projecting from the top surface of said upper flange and a take-up reel constructed with an upper flange, a lower flange, a reel drum having a larger breadth than that of the reel drum in said feeding reel and for connecting said upper and lower flanges, and a center boss projecting from the top surface of said upper flange and being colored in a different color from that of the center boss of said feeding reel.

3 Claims, 3 Drawing Figures

MAGNETIC TAPE CARTRIDGE

BACKGROUND OF THE INVENTION

1. Field of the Invention

This invention relates to a winding reel for magnetic tape to be accommodated in a magnetic tape cartridge for use. More particularly, it is concerned with the winding reel for the magnetic tape which can be suitably used in the magnetic tape cartridge for VTR (video tape recorder), in particular.

2. Description of the Prior Art

The conventional magnetic tape cartridge is constructed in such a manner that upper and lower half cases shaped from a plastic material are joined together to form a closed space inside it, and a pair of reels for feeding and winding (or taking-up) the magnetic tape are fitted in the internal cavity formed by the upper and lower half cases as joined together, and a magnetic tape is wound on and extended between these reels.

FIG. 1 of the accompanying drawing illustrates one embodiment of the internal structure of the conventional magnetic tape cartridge for VTR, in which the upper half case of the magnetic tape cartridge is shown to have been removed. As illustrated in the drawing, the magnetic tape cartridge is so constructed that a feeding reel 4 and a winding reel 6 are disposed in the lower half case 2, and a magnetic tape T is guided from the feeding reel 4 to the take-up reel 6 through tape guides 8, 10, 12 and 14 for tape feeding.

In the meantime, the conventional feeding reel 4 and the take-up reel 6 are of the same construction as shown, for example, in FIGS. 2 and 3. In more detail, the reels 4 and 6 each include the lower flange 22 of a synthetic resin material with a reel drum 20, on which the magnetic tape T is wound, being integrally formed therewith, and the upper flange 26 joined to the end face 24 of the abovementioned reel drum 20 in confrontation to the lower flange 22. While the upper flange 26 and the reel drum 20 can be joined by various well known methods, it is preferable that, as shown in the drawing, a plurality of projections 28 are provided on the end face 24 of the reel drum 20, and they are fitted in holes 30 formed at corresponding positions in the upper flange 26 to pass therethrough so as to be protruded from the holes 30. Then, these projections are melted to fixedly secure the upper flange 26 to the reel drum 20. In addition, a center boss 32 is fixedly provided at the center position of the reel drum 20 in a manner to project from the top surface of the upper flange 26. The center boss 32 is to define a rotational axis of the reel in cooperation with an external drive shaft receiving socket (not shown in the drawing) formed by drilling a hole in the reel drum 20 from the other end of the reel drum 20 along its center axis. Further, in the embodimental reel, a dovetail groove 34 is formed in one outer peripheral part of the reel drum 20. In this dovetail groove 34, there is fitted a clamp 36 having an outer peripheral surface to define the entire circumference thereof in cooperation with the reel drum 20. Both dovetail groove 34 and the clamp 36 serve to fasten the leading edge of the magnetic tape T to the reel drum 20, as shown in FIG. 3.

In the conventional magnetic tape cartridge 1 of such construction, since the feeding reel 2 and the take-up reel 4 are in exactly the same shape and size as mentioned in the foregoing, it is not required to assemble the feeding reel 2 and the take-up reel 4 by making distinction between them. As the results of various researches and experiments, however, it was discovered that, by making the reel drum 20 broader than that of the feeding reel 4, it becomes possible to remarkably reduce possible damage to the magnetic tape, and to prolong use of the tape over a long period of time. On account of this, the feeding reel 4 and the take-up reel 6 have been so manufactured that only the breadth of the reel drum 20 may become different. As the consequence of this, for both the feeding reel 4 and the take-up reel 6 it has become necessary to distinguish them from each other at the time of their assembly.

SUMMARY OF THE INVENTION

In view of the foregoing problem inherent in the conventional magnetic tape cartridge, it is the primary object of the present invention to provide an improved magnetic tape cartridge which makes it possible to distinguish the feeding reel and the take-up reel by differently coloring the center boss of each reel to be readily recognizable by assembly workers of the magnetic tape cartridge.

According to the present invention, in its general aspect, there is provided a combination of feeding reel and take-up reel for a magnetic tape cartridge which comprises a feeding reel constructed with an upper flange, a lower flange, a reel drum for connecting said upper and lower flanges, and a center boss projecting from the top surface of said upper flange; and a take-up reel constructed with an upper flange, a lower flange, a reel drum having a larger breadth than that of the reel drum in said feeding reel and for connecting said upper and lower flanges, and a center boss projecting from the top surface of said upper flange and being colored in a different color from that of the center boss of said feeding reel.

There has thus been outlined, rather broadly, the more important feature of the present invention in order that the detailed description thereof that follows may be better understood, and in order that the present contribution to the art may be better appreciated. There are, of course, additional features of the present invention that will be described hereinafter and which will form the subject of the claims appended hereto. Those skilled in the art will appreciate that the conception, upon which this disclosure is based may readily be utilized as a basis for the designing of other structure for carrying out the several purposes of the present invention. It is important, therefore, that the claim be regarded as including such equivalent construction so far as they do not depart from the spirit and scope of the present invention.

BRIEF DESCRIPTION OF THE DRAWINGS

Specific embodiment of the present invention has been chosen for the purpose of illustration and description, and is shown in the accompanying drawing, forming a part of the specification, in which.

DETAILED DESCRIPTION OF THE PREFERRED EMBODIMENTS

Figure 1:
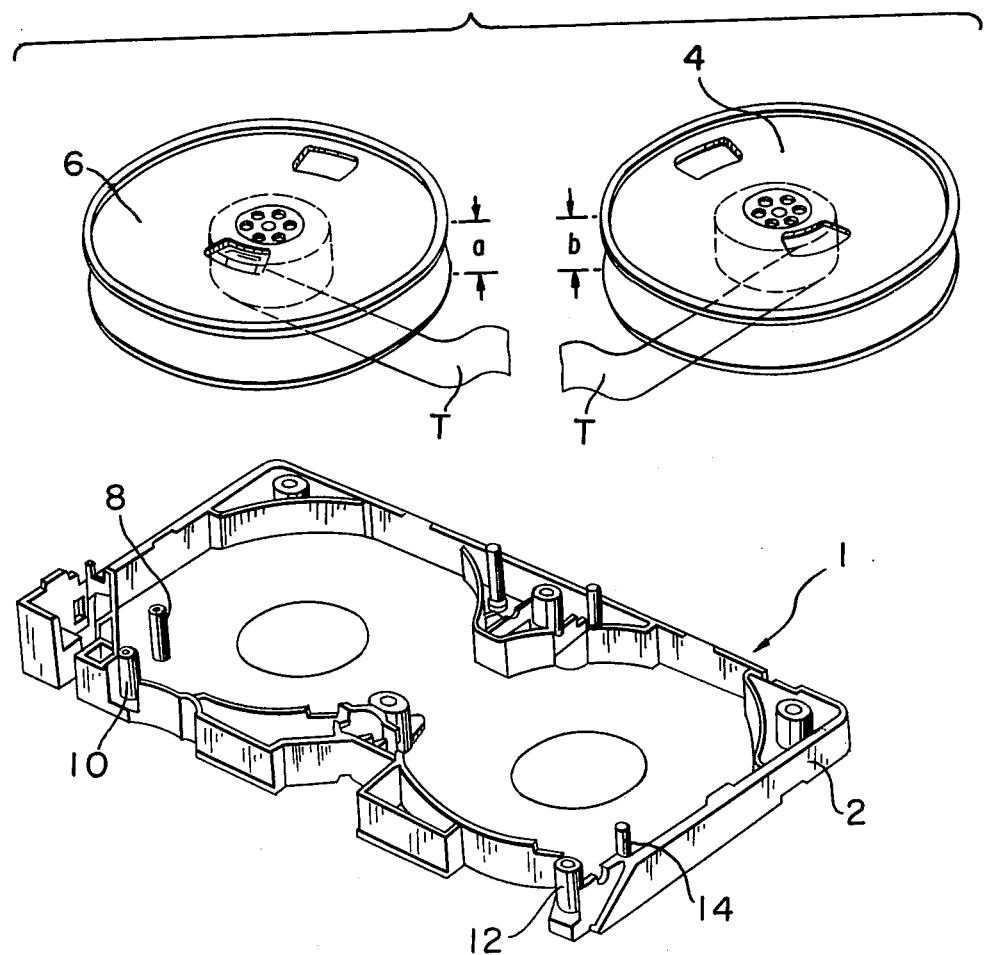
FIG. 1 is an exploded perspective view showing an outline of the magnetic tape cartridge for VTR.
Figure 2:
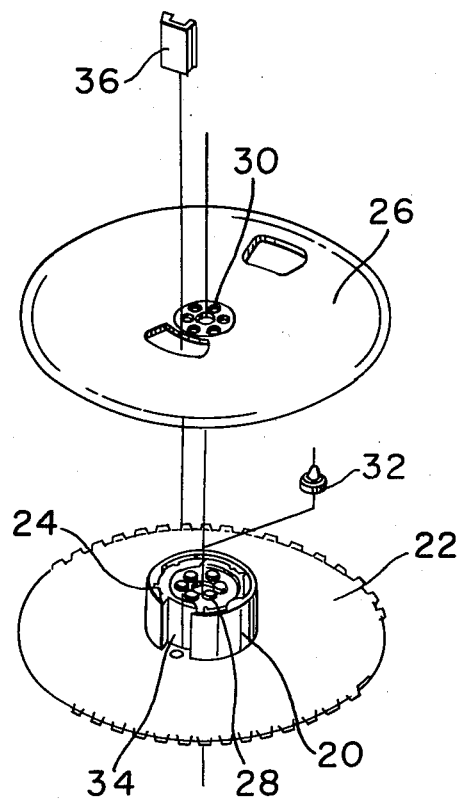
FIG. 2 is an exploded perspective view of the reel.
Figure 3:
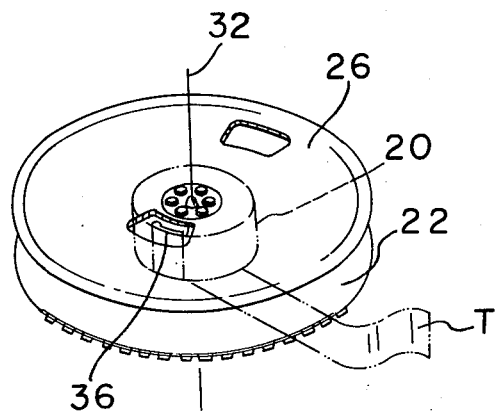
FIG. 3 is also a perspective view of the reel after its assembly.

In order to protect the magnetic tape from damage during its use on the feeding and take-up reels, the breadths a and b of the reel drums 20 on reels 6 and 5, respectively may differ only slightly in practice, which is as small as 0.3 to 0.5 mm. This difference in breadth of the reel drum on both feeding and take-up reels is difficult for assembly workers to distinctly recognize with their naked eyes.

The present invention makes it a point that the center bosses 32 of the feeding reel and the take-up reel are differently colored so as to visually distinguish which is which to thereby solve the problem to arise in their assembly as mentioned in the foregoing. The center boss is the constituent member of the magnetic tape cartridge which positions at the highest level in the tape cartridge in its assembly step, hence it has such an effect that it is readily recognizable to the eyes of the assembly workers. Furthermore, since the center boss 32 can be shaped independently as mentioned in the preceding, and is also small in size, additional step required for coloring the same and its maufacturing cost will be to a negligible extent.

It is possible to form a colored center boss on the top surface of the upper flange in one piece.

What is claimed as new and desired to be secured by Letters Patent of the United States is:

1. A combination of feeding and take-up reels in a magnetic tape cartridge, which comprises:
   (a) a feeding reel constructed with an upper flange, a lower flange, a reel drum for connecting said upper and lower flanges, and a center boss projecting from the top surface of said upper flange; and
   (b) a take-up reel constructed with an upper flange, a lower flange, a reel drum having a larger breadth than that of the reel drum in said feeding reel and for connecting said upper and lower flanges, a center boss projecting from the top surface of said upper flange, and means for differentiating said feeding reel and said take-up reel, said means for differentiating comprising color coding at least one of said center bosses.

2. A combination according to claim 1 wherein said color coded center boss is fitted to the top surface of said upper flange.

3. A combination according to claim 1 wherein said color coded center boss is formed on the top surface of said upper flange.

* * * * *